UNITED STATES PATENT OFFICE.

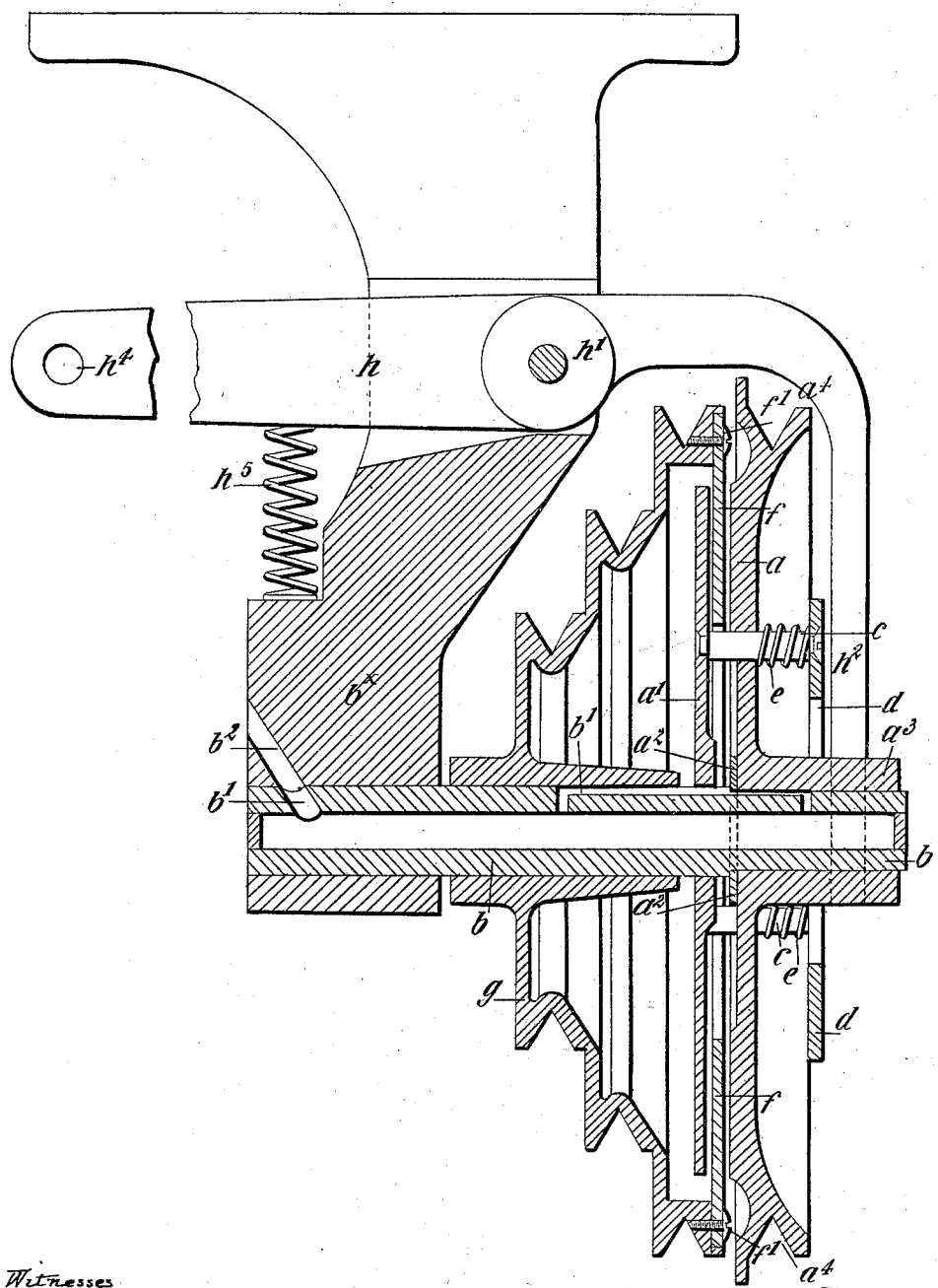

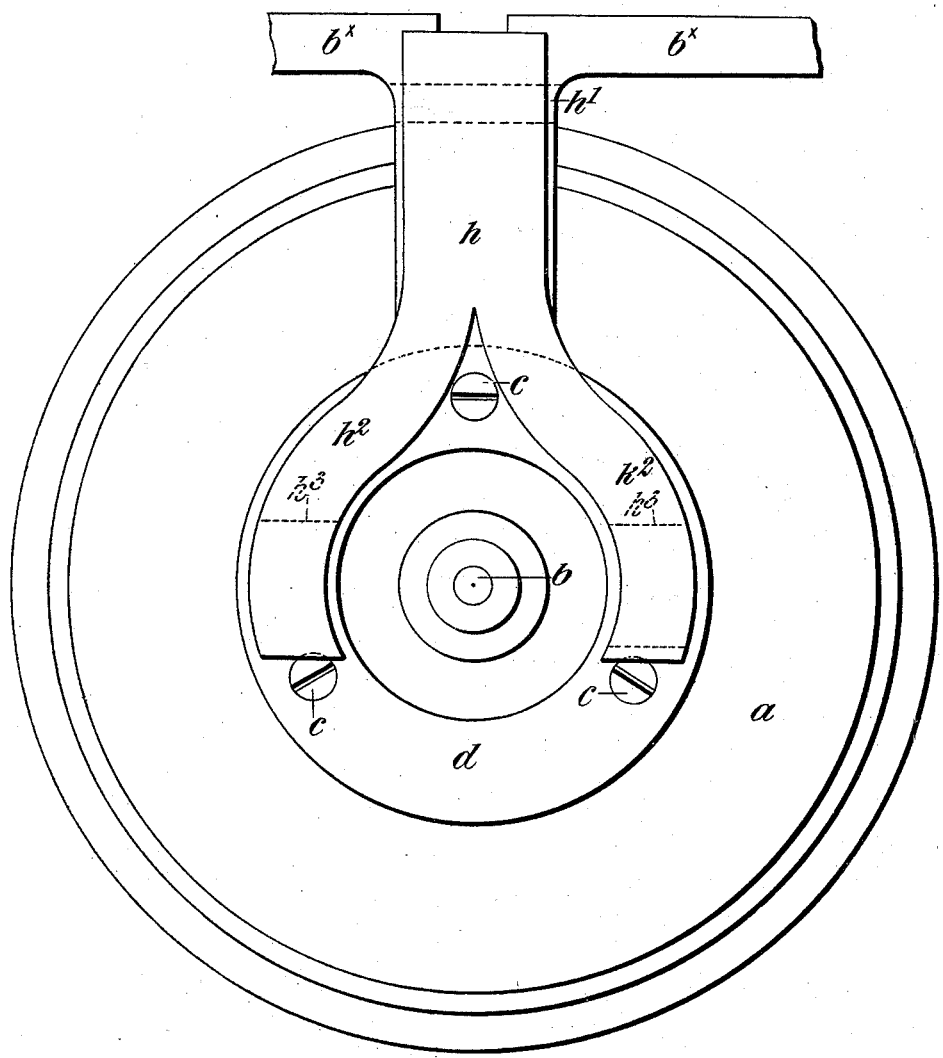

THOMAS ROBERT ROSSITER, OF KNOWLE, AND DONALD NOBLE, OF BRISTOL, ENGLAND.

FRICTION-CLUTCH.

SPECIFICATION forming part of Letters Patent No. 611,512, dated September 27, 1898.

Application filed December 31, 1897. Serial No. 664,905. (No model.)

*To all whom it may concern:*

Be it known that we, THOMAS ROBERT ROSSITER, engineer, residing at Kinghill Villa, Knowle, in the county of Somerset, and DONALD NOBLE, engineer, residing at 87 Victoria street, Bristol, in the county of Gloucester, England, subjects of the Queen of Great Britain, have invented an Improved Friction-Clutch, of which the following is a specification, reference being had to the accompanying drawings.

This invention relates to an improved friction-clutch applicable to main driving-shafts and to various other purposes where friction-clutches can be employed.

The said invention is designed more particularly to overcome the objection which applies to such clutches as usually constructed from the fact that the pressure of the loose portion of the clutch against the fast portion thereof is apt to throw a considerable strain upon the shaft-bearings or upon the mechanism being driven. Now according to our invention one portion of the clutch—that is to say, the gripping portion or device—comprises two parts in rotary connection with each other, but so arranged side by side that the distance between them can be varied. These two parts are acted on by springs which tend to press them together, and between them is situated the friction device of the other portion of the clutch. The arrangement is such that the gripping parts normally press equally in opposite directions against the said friction device and so form a driving connection therewith. The pressure of one part thus counteracts that of the other and a balanced action is obtained, entirely obviating any strain or endwise pressure on the shaft or bearings. Means are provided whereby the said gripping parts can be caused to open or separate when it is desired that the driving connection should cease.

The friction device of the clutch may consist of an annular disk of any suitable metal or material, and the said device may be in the form of a double cone or a conical ring, or it may be of any other suitable shape, the aforesaid parts of the gripping portion of the clutch being correspondingly shaped. The driving power is transmitted to a pulley, cone, or the like connected with the friction device in any convenient manner.

In order that our invention may be clearly understood and readily carried into effect, we will proceed to describe the same by aid of the accompanying drawings, in which—

Figure 1 is a longitudinal central section of one construction of clutch, showing the parts in their inoperative position; and Fig. 2 is an end view of the said clutch.

$a$ $a'$ are the two parts of the gripping portion of the clutch, and $b$ is the shaft or spindle, on which they are free to rotate, but on which the part $a$ is prevented from moving endwise by a collar $a^2$. This shaft is hollow and has oil-holes or passages $b'$ for admitting lubricant to the interior thereof and thence to the parts mounted thereon. The shaft itself is rigidly secured in a bracket or bearing $b^\times$, fixed, say, to some convenient stationary part of the machine-frame, and has an oil-hole $b^2$ corresponding to one of the oil-holes $b'$. The part $a'$ of the clutch consists of an annular disk and is connected by bolts $c$ with a disk or ring $d$, situated on the opposite side of the part $a$ and surrounding the boss $a^3$ of the said part.

$e$ $e$ are the springs which tend to press the part or section $a'$ toward the part or section $a$. These springs surround the bolts $c$ and, being compressed between the ring $d$ and the part $a$, tend to force the said ring away from it and draw the part $a'$ up to it through the medium of the bolts $c$.

$f$ is the friction disk or ring, forming the other portion of the clutch, which device in this case consists of a leather washer secured by screws $f'$ to a loose speed-cone or driving-pulley $g$ on the shaft $b$, this cone-pulley receiving the driving-belt leading from the source of power. The edge of the cone-pulley $g$ to which the washer $f$ is fastened rotates outside the parts $a$ $a'$ of the clutch and the said washer extends inward between the said parts and is normally held or nipped between them, so providing a driving connection between the cone-pulley and the gripping portion of the clutch. In the arrangement shown the part $a$ of the said gripping portion of the clutch has a grooved periphery $a^4$, adapted to receive a band to transmit the motion received from the washer $f$ to the apparatus to be driven. It will be readily understood, however, that such motion may be transmitted by gearing or otherwise or be taken from the said shaft direct, if the latter be arranged to rotate with the gripping portion of the clutch.

The means for separating the gripping parts $a\ a'$ of the clutch, so as to cause the driving connection to cease, consists of a forked lever $h$, pivoted at $h'$ to the bracket $b^\times$ or to some other suitable stationary part near the clutch. The shorter forked arm of this lever is bent over the clutch at right angles, the two parts or fingers $h^2$ being situated at opposite sides of the center of the ring $d$ and provided on the sides adjacent to the said ring with leather or other suitable pads $h^3$. The lever $h$ is operated in any suitable manner—say by links, cords, or levers (not shown) connected to an eye $h^4$ on one end of the longer portion of the lever, the arrangement being such that the lever will press the pads $h^3$ laterally against the ring $d$ when desired. When the lever is thus operated, the ring $d$ is pressed toward the part $a$ of the clutch and at the same time moves the part $a'$ away from the said part $a$ into the position shown in Fig. 1, thus releasing the leather washer $f$ and so interrupting the driving connection with the speed-cone. At the same time the pads $h^3$ act very efficiently as brakes upon the ring $d$, and thus serve to bring the parts $a\ a'$ positively and instantaneously to rest.

The lever $h$ may be acted on by a spring, such as $h^5$, which tends to constantly move it in such a direction as to throw the clutch out of action, the said spring being sufficiently powerful to overcome the action of the smaller springs $e$.

It will also be obvious that any other suitable separating device may be employed instead of the lever $h$ for causing the gripping portion of the clutch to release the washer $f$.

What we claim is—

1. A friction-clutch, consisting of a friction disk or ring, two sections in rotary connection at opposite sides of the friction-ring, means for constantly pressing one of the rotary sections toward the other for gripping the opposite sides of the friction disk or ring, and means for separating the said two sections to disengage the clutch, substantially as and for the purposes described.

2. A friction-clutch, consisting of a friction disk or ring, two sections in rotary connection at opposite sides of the friction-ring, means for constantly pressing one of the rotary sections toward the other for gripping the opposite sides of the friction disk or ring, and a lever for separating the said two sections to disengage the clutch, substantially as and for the purposes described.

3. A friction-clutch, consisting of a pulley to be driven, two rigidly-connected disks located, respectively, at the inner and outer sides of said pulley, a driving-pulley having a friction disk or ring attached thereto, carried solely thereby and located between the driven pulley and the inner disk, springs acting to press the inner disk in a direction toward the pulley to be driven for causing said pulley and said disk to grip the friction disk or ring, and means for moving the inner disk in a direction away from the pulley to be driven, substantially as and for the purposes described.

In testimony whereof we have hereunto set our hands this 15th day of December, 1897.

THOMAS ROBERT ROSSITER.
DONALD NOBLE.

Witnesses:
GERARD MOSELY,
JAMES SMITH.